(12) United States Patent
Daoud

(10) Patent No.: US 6,300,562 B1
(45) Date of Patent: Oct. 9, 2001

(54) SELF-SEALING TELECOMMUNICATIONS ENCLOSURE

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/363,572

(22) Filed: Jul. 29, 1999

(51) Int. Cl.[7] ....................................................... H01J 5/00
(52) U.S. Cl. ................. 174/50; 174/58; 174/60; 220/4.02; 385/135; 29/868
(58) Field of Search ................. 174/48, 50, 53, 174/58, 17 R, 60; 220/3.2, 3.3, 4.02; 439/535; 385/134, 135; 29/868, 729

(56) References Cited

U.S. PATENT DOCUMENTS

| | | | |
|---|---|---|---|
| 4,913,522 | 4/1990 | Nolf et al. | 350/96.2 |
| 4,983,008 | 1/1991 | Campbell et al. | 350/96.16 |
| 5,059,748 | 10/1991 | Allen et al. | 174/87 |
| 5,069,516 | 12/1991 | Kohy et al. | 350/96.1 |
| 5,155,794 | 10/1992 | Nolf et al. | 385/135 |
| 5,249,253 | 9/1993 | Franckx et al. | 385/135 |
| 5,286,919 * | 2/1994 | Benson et al. | 174/50 |
| 5,308,923 | 5/1994 | Puigcerver et al. | 174/87 |
| 5,315,489 | 5/1994 | McCall et al. | 361/801 |
| 5,396,575 | 3/1995 | Hayward et al. | 385/135 |
| 5,568,362 * | 10/1996 | Hansson | 174/50 X |
| 5,574,251 * | 11/1996 | Sevier | 174/60 X |
| 5,602,954 | 2/1997 | Nolf et al. | 385/135 |
| 5,710,804 | 1/1998 | Bhame et al. | 379/58 |
| 5,726,385 * | 3/1998 | Lowery et al. | 174/50 |
| 5,837,933 * | 11/1998 | Fligelman | 174/50 |
| 5,864,091 * | 1/1999 | Sumida | 174/50 |
| 5,911,117 | 6/1999 | Bhame et al. | 455/90 |
| 6,005,188 * | 12/1999 | Teichler et al. | 220/4.02 X |
| 6,078,718 * | 6/2000 | Merriken et al. | 385/135 |
| 6,097,872 * | 8/2000 | Kusuda et al. | 385/135 X |
| 6,147,304 * | 11/2000 | Doherty | 174/48 |
| 6,157,766 * | 12/2000 | Laniepce et al. | 385/134 |
| 6,175,079 * | 1/2001 | Johnston et al. | 174/50 |

\* cited by examiner

*Primary Examiner*—Dean A. Reichard
*Assistant Examiner*—Dhiru R Patel
(74) *Attorney, Agent, or Firm*—Duane, Morris & Heckscher LLP

(57) ABSTRACT

A sealed fiber optic enclosure assembly includes a fiber optic enclosure having an inner rim, and an end cap shaped to fit the enclosure. The end cap has a pliable membrane depending from it. The membrane is approximately a cylindrical structure. The membrane may have a wedge-shaped cross section. The wedge-shaped cross section may have an elbow in it. The membrane and end cap may be formed from a single piece of a pliable material, such as polypropylene. The membrane extends into the rim of the enclosure when the end cap is in place on the enclosure. The enclosure has a neck that transitions from a first diameter to a second diameter smaller than the first diameter. The second diameter is smaller than a diameter of the membrane. A clamp is placed over mating portions of the enclosure and end cap, for clamping the end cap to the enclosure. The clamp may be a V-clamp. Pressure is introduced to the enclosure. The membrane is forced against the rim when the enclosure is pressurized, to form a seal between the membrane and the rim. A gap is present between the membrane and a neck portion of the rim before the enclosure is pressurized. The membrane moves to bridge the gap when the enclosure is pressurized. The integrity of the seal can be verified by visually inspecting the enclosure to check whether the end cap is inserted in the enclosure.

20 Claims, 5 Drawing Sheets

SELF-SEALING TELECOMMUNICATIONS ENCLOSURE

FIELD OF THE INVENTION

The present invention relates to telecommunications equipment generally, and more specifically to enclosures suitable for communications cables, such as optical fiber cables.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation.

U.S. Pat. No. 5,069,516 to Kohy et al. and U.S. Pat. No. 5,396,575 to Hayward et al. are expressly incorporated by reference herein in their entireties for their teachings on sealed fiber enclosures.

Fiber enclosures are required to be water tight, as they are subjected to a variety of environmental conditions. Such enclosures are frequently deployed underground, and it is important to ensure that water does not come in contact with the optical fiber cables or electronic equipment.

Because there is a need to access the equipment inside the enclosures to reconfigure the equipment following deployment, the enclosures cannot be permanently sealed. Rather, a seal is required that is easily released in order to perform work inside the enclosure, and easy to reseal when the work is completed. It is common to use an o-ring seal in fiber optic enclosures. For a good seal, the end cap must be seated properly in the enclosure. If the end cap is not seated properly, the o-ring may not be water-tight.

A fiber optic enclosure may be mounted on a pole, where it is difficult to visually inspect the enclosure closely to check whether the end cap is aligned precisely on the enclosure. In addition, if particles of dirt or grease are on the o-ring, the o-ring may not seal properly. It is particularly difficult to detect these impurities visually.

Thus, a seal is desired that is reliable, water-tight, and easy to verify.

SUMMARY OF THE INVENTION

The present invention is a sealed telecommunications enclosure and a method for sealing the telecommunications enclosure. An end cap is placed on the telecommunications enclosure. The end cap has a pliable membrane depending therefrom. The membrane extends into a rim of the enclosure when the end cap is in place on the enclosure. The enclosure is pressurized, so as to force the membrane against the rim, thereby forming a seal between the membrane and the rim.

DETAILED DESCRIPTION

Figure 1:
FIG. 1 is a rear elevation view of an exemplary enclosure according to the present invention.
Figure 2:
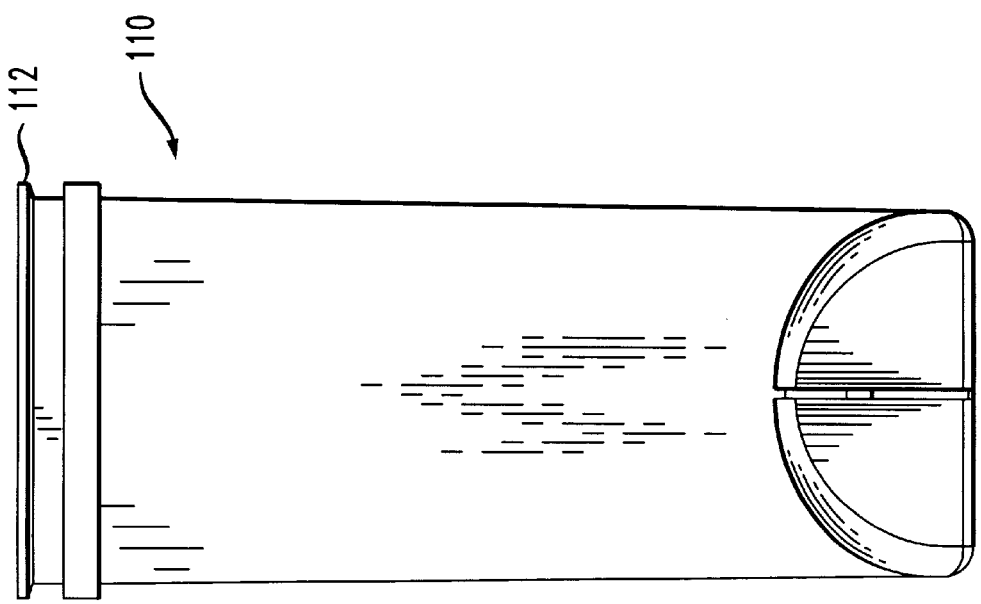
FIG. 2 is a side elevation view of the enclosure shown in FIG. 1.

The present invention is a self-sealing telecommunications enclosure assembly 100. FIGS. 1 and 2 show the enclosure 110, into which fiber and equipment (not shown), are installed. The interior of the enclosure 100 may contain a card cage (not shown) having slots for accommodating a plurality of printed circuit boards having electrical circuits and/or electrical/optical transducers (not shown). The electrical circuits may provide a variety of functions, such as processing optical and electrical voice, data, and/or video signals, generating alarms and various signaling information, etc. The contents of the enclosure may include a tray having a plurality of attachment sections into which optical fiber splices, connectors or standard end fiber terminations can be retained. Optical fiber which is not being coupled within the enclosure 110 can also be stored within the enclosure.

Figure 3:
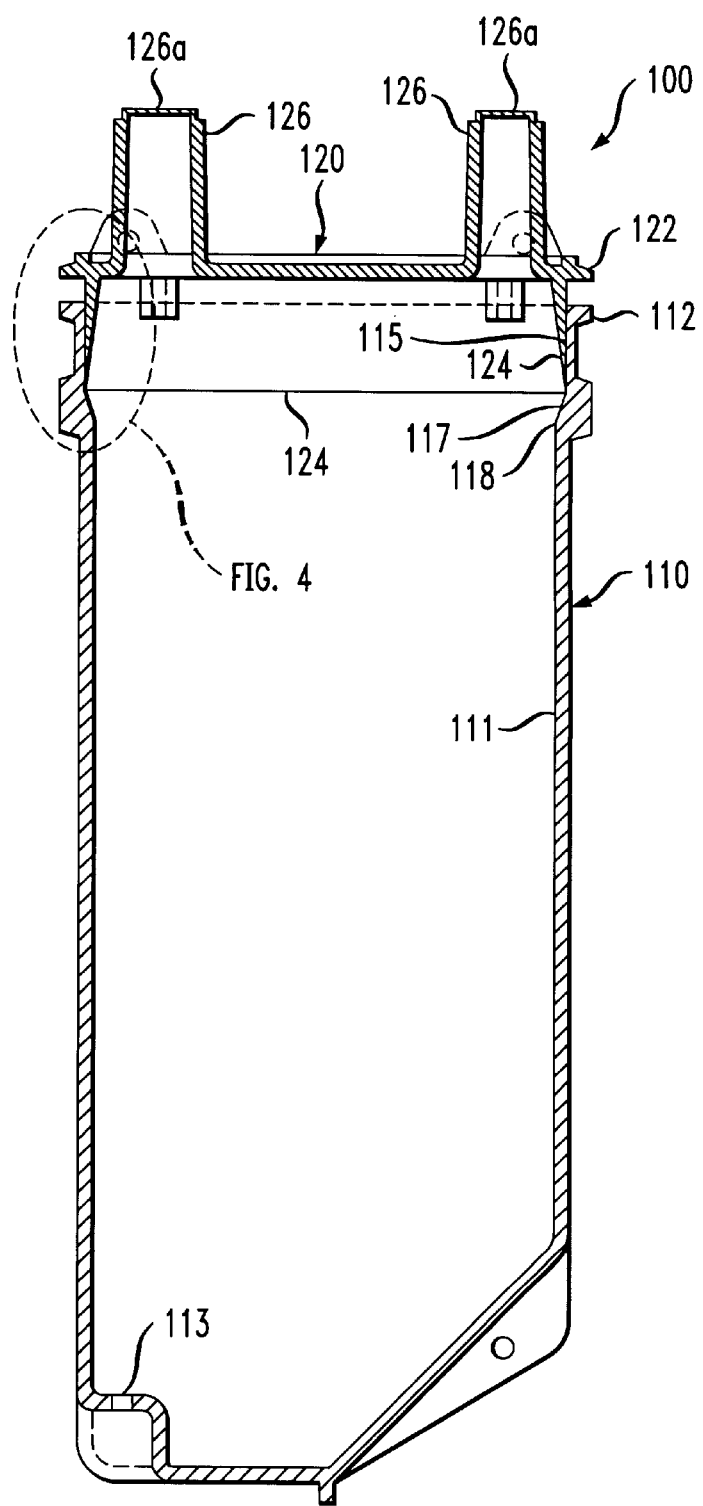
FIG. 3 is a cross sectional view of the enclosure of FIG. 1, with a first exemplary end cap partially inserted therein.
Figure 4:
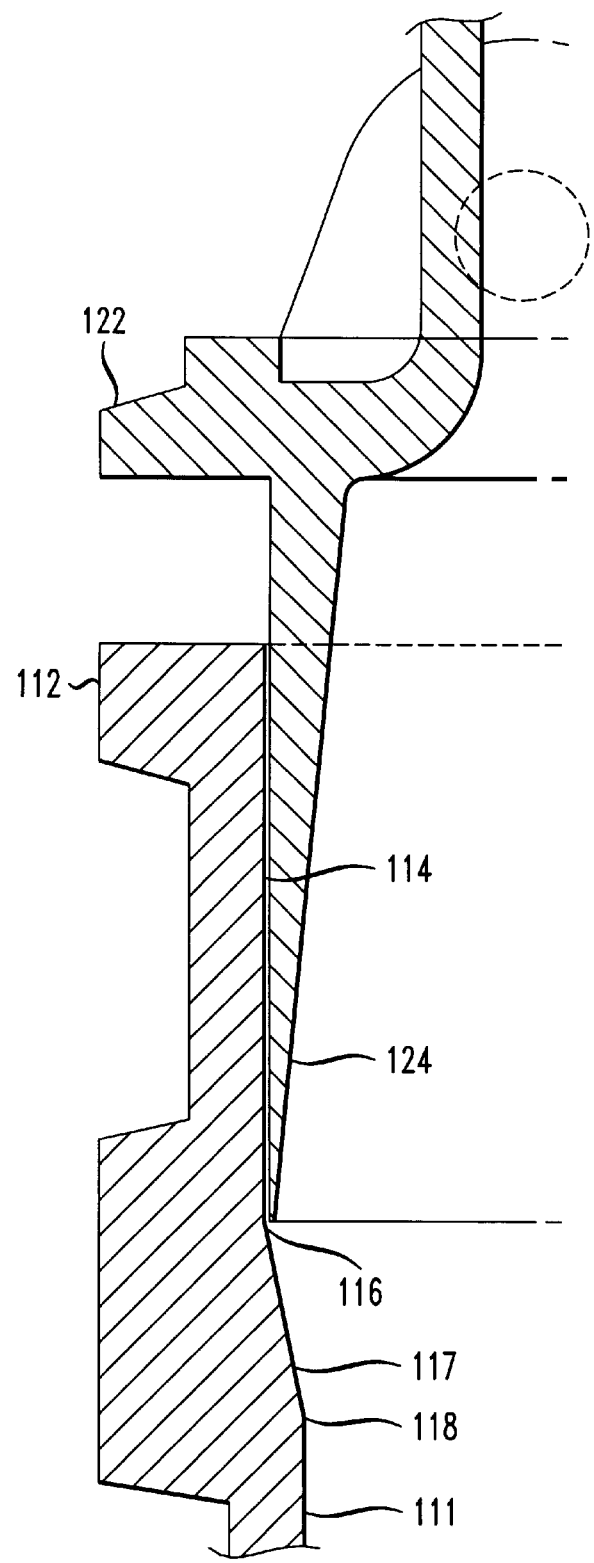
FIG. 4 is an enlarged detail of a portion of the enclosure shown in FIG. 3.

FIG. 3 is a cross sectional view of the enclosure assembly 100, with the end cap 120 partially inserted in the enclosure 110. FIG. 4 is an enlarged view of the rim portion of the enclosure assembly 100. The fiber optic enclosure assembly 100 includes a fiber optic enclosure 110 having an inner rim 114. The top of rim 114 has a diameter that is larger than the diameter of the main part 111 of the enclosure 110. A neck section 117 transitions from the enlarged diameter of the rim section 114 to the reduced diameter of the main section 111. The slope of the enclosure housing 110 changes at two points 116 and 118, which define the neck section 117.

The enclosure 110 has an opening 113 through which pressurized air can be introduced to the enclosure. A valve (not shown) can be mounted in the hole 113, to allow either introduction of air or the measurement of air pressure in the enclosure assembly 100.

In the exemplary embodiment, the rim 114 and the main section 111 are substantially vertical in cross section. The neck section 117 is tilted at an angle between about 10 degrees and about 20 degrees from the vertical. Thus, there is a change in slope at location 116 (i.e., at the top of the neck section 117).

An end cap 120 is shaped to fit the enclosure 110. The end cap 120 has a plurality of cable ports 126, through which cables (which may contain optical fibers) enter the enclosure assembly 100. The cable ports 126 may have a variety of sizes to accommodate differently sized cables. Prior to installation, each of the cable ports 126 has a flat disk 126a integrally attached to the end of the cable port. The flat disks 126a are left on unused cable ports 126 until they are used, so that the enclosure assembly 100 can be sealed and pressurized. To use one of the cable ports 126, the top of the cable port, including the flat disk 126a is cut off with a blade, which may be a saw blade. When a cable (not shown) is inserted through a cable port 126, a seal is placed around the cable port, typically using a sleeve of heat shrink tubing.

The end cap 120 has a thin, pliable membrane 124 depending therefrom. The membrane 124 extends into the inner rim 114 of the enclosure 110 when the end cap 120 is in place on the enclosure. The membrane 124 is forced against the rim 114 when the enclosure 100 is pressurized, thereby forming a seal between the membrane and the rim. The exemplary membrane 124 is approximately a cylindrical structure. As best seen in FIG. 4, the membrane 124 may have a wedge shaped cross section, and preferably has a thickness that tapers off to a very thin pliable layer at the bottom of the membrane. A flexible material, such as polypropylene, is preferred for the membrane material. The membrane 124 and end cap 120 may be formed from a single piece of material.

Although a membrane having a continuous cross-sectional thickness (not shown) may alternatively be used, the wedge shaped profile is advantageous. As the thickness of the membrane 124 tapers off to approximately zero thickness, the area moment of inertia of the membrane also tapers off. As a result, the bottom end of the membrane 124 is especially pliable, and can be more easily pressed into place against the neck 117 of the inner rim 114 by air pressure, as described in detail below.

Referring again to FIG. 4, when the membrane 124 reaches the top 116 of the neck portion 117, the membrane 124 deforms inwards towards the longitudinal axis of the enclosure 110. A gap is formed between the outer circumference of membrane 124 and the neck section 117 of the enclosure 110, best shown and described below with reference to FIG. 6. The membrane 124 deforms outward to bridge the gap when the enclosure is pressurized.

Figure 5:
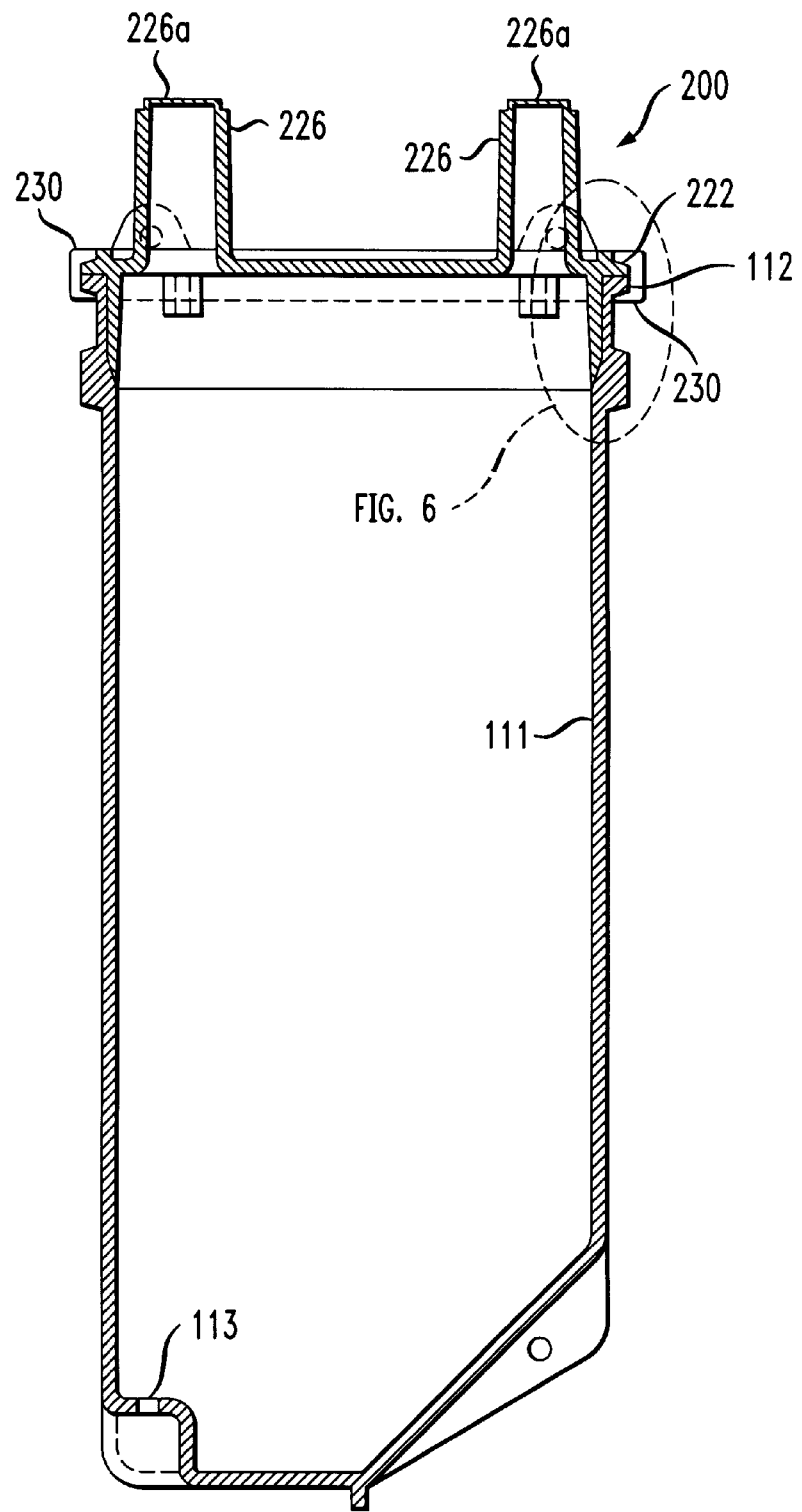
FIG. 5 is a cross sectional view of the enclosure of FIG. 1, with a second exemplary end cap completely inserted therein.
Figure 6:
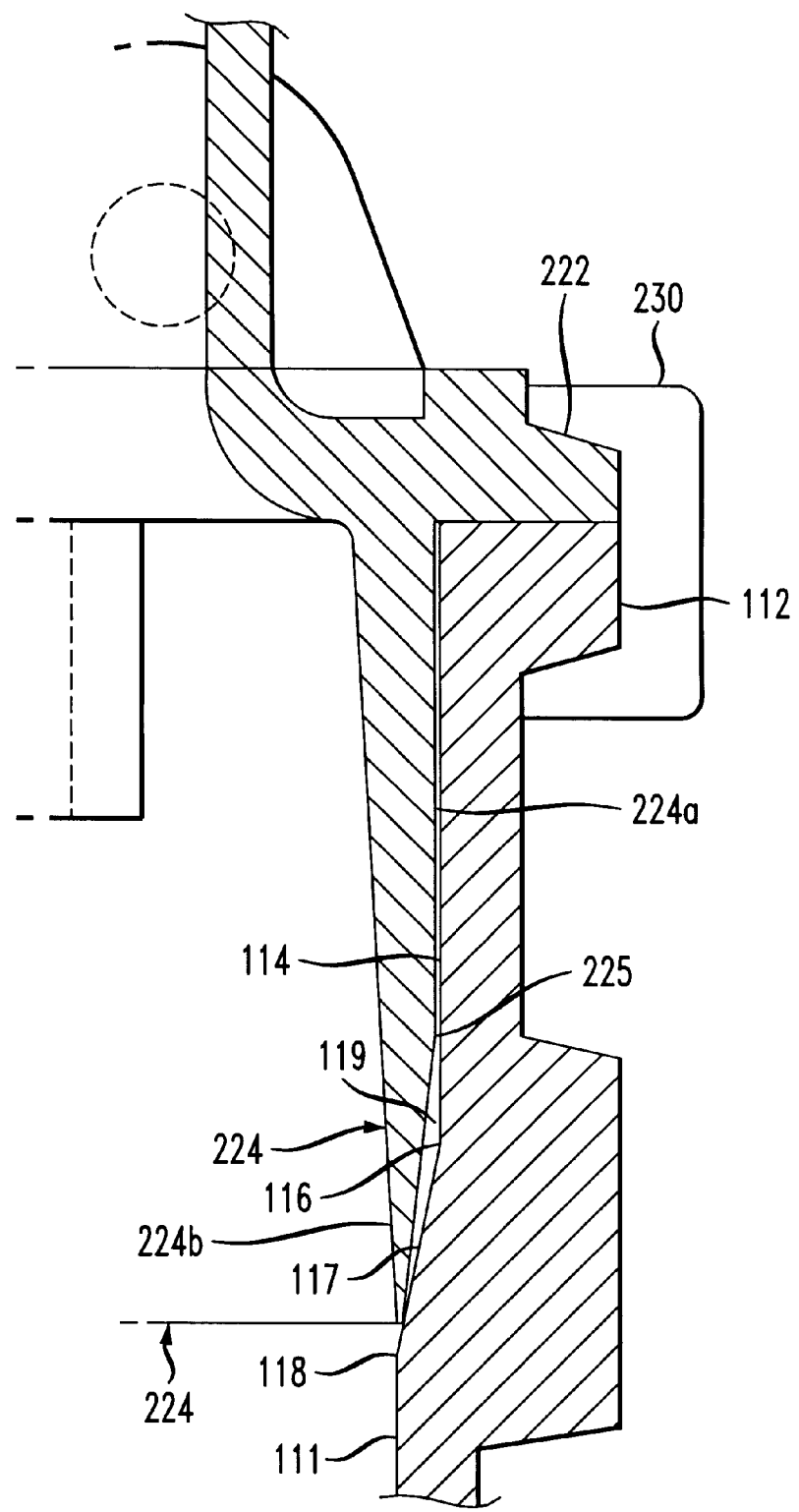
FIG. 6 is an enlarged detail of a portion of the enclosure shown in FIG. 5.

FIGS. 5 and 6 show a variation of the exemplary embodiment. FIG. 5 shows an enclosure assembly 200, including the same enclosure 110 as described above with reference to FIG. 3. In FIGS. 5 and 6, a slightly different end cap 220 is used. Features of the end cap 220 that correspond to features of end cap 120 (FIG. 3) are indicated by reference numerals having the same last two digits. The membrane 224 of end cap 220 has an elbow 225 in the wedge-shaped cross section, best seen in FIG. 6. Below the elbow 225, the thickness of the bottom portion 224b of the membrane decreases more quickly than in the top section 224a of the membrane. Thus, section 224b has a desirable pliability. Further, because the slope of the bottom portion 224b of the membrane is greater than the slope at the top section 224a of the membrane, the gap 119 (FIG. 6) between the membrane 224 and the neck 117 of the enclosure 110 is greater at the top 116 of the neck. Thus, a larger deformation by the bottom portion 224b of the membrane 224 occurs upon application of pressure.

As shown in FIGS. 5 and 6, to assemble the enclosure assembly 200, the end cap 220 is inserted all the way into the rim 114 of the enclosure 110. The enclosure 110 and end cap 220 have respective mating parts 112 and 222, which abut each other when the end cap is completely inserted. Once the end cap 220 is installed on the enclosure 110, a clamp 230 is applied to clamp the end cap 220 to the enclosure 110, and to keep the end cap from moving. The clamp 230 may be, for example, a V-clamp. U.S. Pat. No. 5,315,489 to McCall et al. is expressly incorporated by reference herein for its teachings on a clamp suitable for use on fiber enclosures. A clamp as described by McCall et al. may be used to clamp the enclosure assembly 200.

The gap 119 is present between the membrane 224 and the neck portion 117 of the rim 114 before the enclosure assembly 200 is pressurized. The membrane 224 moves against the rim 114 and the neck portion 117 to bridge the gap 119 when the enclosure assembly 200 is pressurized, thereby forming a seal between the membrane and the rim.

This sealing action of the enclosure assembly 200 occurs automatically upon pressurization of the enclosure, and is not sensitive to any slight misalignment of the end cap, or to the presence of any dirt or grease on the end cap 220. So long as the end cap 220 is inserted completely, an adequate seal is formed. Thus, the installer can verify the integrity of the seal by visually inspecting the enclosure 200 to check whether the end cap is inserted in the enclosure.

Although the method of inserting the end cap 220, clamping the assembly 200 with the clamp 230, and pressurizing the enclosure assembly 200 is only described herein with reference to FIGS. 5 and 6, the same steps are performed to close and seal the enclosure assembly 100 of FIGS. 3 and 4.

If it is necessary to open the enclosure to reconfigure the equipment or cables therein, the pressure is released through the pressure valve (not shown), the clamp 230 is removed, and the enclosure is opened. Upon completion of the reconfiguration, the enclosures 100 and 200 are closed and sealed by the same method described above.

Although the exemplary embodiment is described in the context of a fiber optic enclosure, the exemplary enclosure is not limited to fiber, and may be used for other electronic equipment, where a water-tight seal is desired.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for sealing a telecommunications enclosure, comprising the steps of:

(a) placing an end cap on the telecommunications enclosure, the end cap having a pliable membrane depending therefrom, the membrane extending into a rim of the enclosure when the end cap is in place on the enclosure; and (b) pressurizing the enclosure, so as to force the membrane against the rim, thereby to form a seal between the membrane and the rim.

2. The method of claim 1, wherein the membrane is approximately a cylindrical structure.

3. The method of claim 1, wherein the membrane and end cap are formed from a single piece of material.

4. The method of claim 1, wherein the membrane is formed of polypropylene.

5. The method of claim 1, wherein the membrane has a wedge-shaped cross section.

6. The method of claim 5, wherein the membrane has an elbow in the wedge-shaped cross section.

7. The method of claim 1, wherein a gap is present between the membrane and a neck portion of the rim before step (b) is performed, the membrane moving to bridge the gap when step (b) is performed.

8. The method of claim 1, further comprising the step of:

(c) verifying the integrity of the seal by visually inspecting the enclosure to check whether the end cap is inserted in the enclosure.

9. The method of claim 1, further comprising the step of clamping the end cap to the enclosure after step (b).

10. The method of claim 9, wherein a V-clamp is used to perform the clamping.

11. A sealed telecommunications enclosure assembly, comprising:

a telecommunications enclosure having an inner rim; and an end cap shaped to fit the enclosure, the end cap having a pliable membrane depending therefrom, the membrane extending into the rim of the enclosure when the end cap is in place on the enclosure, the membrane being forced against the rim when the enclosure is pressurized, thereby to form a seal between the membrane and the rim.

12. The enclosure assembly of claim 11, wherein the membrane is approximately a cylindrical structure.

13. The enclosure assembly of claim 11, wherein the membrane and end cap are formed from a single piece of material.

14. The enclosure assembly of claim 11, wherein the membrane is formed of polypropylene.

15. The enclosure assembly of claim 11, wherein the membrane has a wedge-shaped cross section.

16. The enclosure assembly of claim 15, wherein the membrane has an elbow in the wedge-shaped cross section.

17. The enclosure assembly of claim 11, wherein a gap is present between the membrane and a neck portion of the rim before the enclosure is pressurized, the membrane moving to bridge the gap when the enclosure is pressurized.

18. The enclosure assembly of claim 11, further comprising a clamp for clamping the end cap to the enclosure.

19. The enclosure assembly of claim 18, wherein the clamp is a V-clamp is used to perform the clamping.

20. The enclosure assembly of claim 11, wherein the enclosure has a neck that transitions from a first diameter to a second diameter smaller than the first diameter, the second diameter being smaller than a diameter of the membrane.

* * * * *